United States Patent [19]
Zivkovic

[11] 3,759,928
[45] Sept. 18, 1973

[54] DIPHENYL-METHYLENE-N-BENZYL-PIPERIDINES

[75] Inventor: Dusan Zivkovic, Rhode-Saint-Genese, Belgium

[73] Assignee: U.C.B., Societe Anonyme, Bruxelles, Belgium

[22] Filed: June 2, 1970

[21] Appl. No.: 42,893

[30] Foreign Application Priority Data
June 5, 1969 Great Britain.................. 28,569/69

[52] U.S. Cl... 260/293.72, 260/293.58, 260/293.62, 260/293.75, 260/293.79, 260/293.83, 260/293.84
[51] Int. Cl............................................ C07d 29/12
[58] Field of Search............... 424/267; 260/293.58, 260/293.62, 293.72, 293.75, 293.79, 293.83

[56] References Cited
UNITED STATES PATENTS
2,739,968   3/1956   Sperber et al...................... 260/293
2,739,969   3/1956   Sperber et al...................... 260/293

OTHER PUBLICATIONS
Lee et al., Tetrahedron 22, 2721–2733 (1966).

*Primary Examiner*—Henry R. Jiles
*Assistant Examiner*—G. Thomas Todd
*Attorney*—Wenderoth, Lind and Ponack

[57] ABSTRACT

Blood circulation activating, anti-arrhythmic and anti-histaminic diphenyl-methylene-N-benzyl-piperidines having the general formula

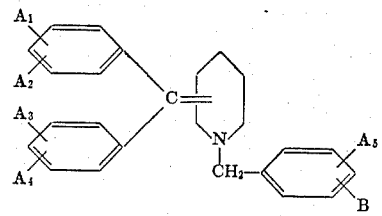

wherein $A_1$, $A_2$, $A_3$, $A_4$, $A_5$ and B, taken separately, each represents hydrogen, halogen, halomethyl, alkyl, alkoxy, nitro, cyano or amino, and $A_5$ and B, taken together, represent a bivalent radical selected from the group consisting of alkylene, alkenylene and alkadienylene having 3 to 5 carbon atoms and alkylene dioxy having 1 to 3 carbon atoms, said bivalent radical being connected to two adjacent carbon atoms of the benzene nucleus, with the proviso that when $A_1$, $A_2$, $A_3$, $A_4$, $A_5$ and B are all hydrogen atoms, the diphenyl-methylene radical is in the ortho or meta position with regard to the nitrogen atom in the piperidine nucleus, and the addition salts thereof with pharmaceutically acceptable inorganic or organic acids.

11 Claims, No Drawings

DIPHENYL-METHYLENE-N-BENZYL-PIPERIDINES

The present invention is concerned with new derivatives of piperidine and with the preparation thereof. It is also concerned with compositions containing these new compounds and with the use thereof in therapy.

The new derivatives of piperidine according to the present invention are diphenyl-methylene-N-benzyl-piperidines having the general formula

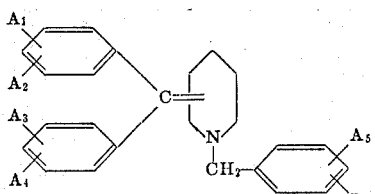

(I)

wherein $A_1$, $A_2$, $A_3$, $A_4$, $A_5$ and B, taken separately, each represents hydrogen, halogen, halomethyl, alkyl of 1–4 carbon atoms, alkoxy, nitro, cyano or amino, and $A_5$ and B taken together, represent a bivalent radical selected from the group consisting of alkylene, such as butylene, alkenylene, such as butenylene and alkadienylene, such as butadienylene, having 3 to 5 carbon atoms and alkylene dioxy having 1 to 3 carbon atoms, such as methylene dioxy, said bivalent radical being connected to two adjacent carbon atoms of the benzene nucleus, with the proviso that when $A_1$, $A_2$, $A_3$, $A_4$, $A_5$ and B are all hydrogen atoms, the diphenyl-methylene radical is in the ortho or meta position with regard to the nitrogen atom in the piperidine nucleus, and the addition salts thereof with pharmaceutically acceptable inorganic or organic acids.

The new compounds of general formula (I) may be prepared in the following manner:

1. Condensation of an appropriately substituted diphenyl-methylene-piperidine of the general formula

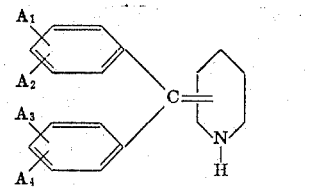

(II)

wherein $A_1$, $A_2$ and $A_3$ and $A_4$ have the same meanings as above, with a benzyl compound of the general formula:

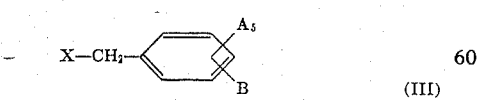

(III)

wherein $A_5$ and B have the same meanings as above and X is a halogen atom or an equivalent reactive group, in an inert solvent in the presence of an acid acceptor; 2. Condensation of an alpha,alpha-diphenyl-piperidine-carbinol of the general formula:

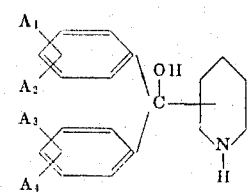

(IV)

in which $A_1$, $A_2$, $A_3$ and $A_4$ have the same meanings as above, with a benzyl compound of general formula (III) in an inert solvent and in the presence of an acid acceptor to give a command of the general formula:

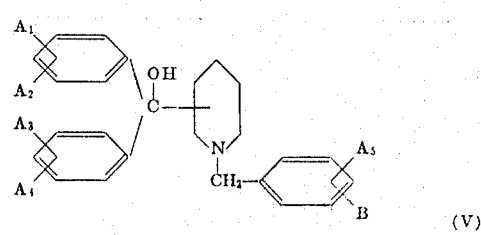

(V)

wherein $A_1$, $A_2$, $A_3$, $A_4$, $A_5$ and B have the same meanings as above, whereafter this compound (V) is reacted with a dehydratation agent in order to remove the elements of water to give the desired product (I).

The new compounds according to the present invention, be they in the form of the free bases or be they in the form of salts with pharmaceutically acceptable inorganic or organic acids, are strong pharmacological agents having anti-histaminic and anti-allergic properties. They also have a favourable action on the cerebral, peripheral and coronary circulations, as well as on the rhythm of contraction of the heart. They are also active against motion sickness.

There is already known a compound which is closely related to the new compounds according to the present invention which is the para homologue of the ortho and meta compounds of general formula (I) in which $A_1$, $A_2$, $A_3$, $A_4$, $A_5$ and B are all hydrogen atoms. However, this compound was synthesised by C.M. LEE, A.H. BECKETT and J.K. SUGDEN (Tetrahedron,22,(1966),2721) only for the elucidation of the structure, in correlation with the NMR spectrum, of certain 4-cyanomethylene-piperidines which were N-substituted, the pharmacological properties thereof not having been studied by these authors. Consequently, it could have not been foreseen that the new compounds according to the present invention possess a strong pharmacological activity.

The following Examples are given for the purpose of illustrating the present invention:

Example 1

4-diphenyl-methylene-1-(4-tert.-butyl-benzyl)-piperidine

A mixture of 15 g. 4-diphenyl-methylene-piperidine, 15.5 g. p-tert.-butyl-benzyl bromide and 9.5 g. anhydrous sodium carbonate in 40 ml. xylene is heated to 120° C. for 8 hours. After cooling the reaction mixture, the sodium bromide formed is filtered off and the filtrate is extracted with dilute hydrochloric acid (10 ml. concentrated hydrochloric acid and 35 ml. water). The hydrochloride formed is only slightly soluble and separates out from the filtrate by crystallisation. The precipitated hydrochloride is filtered off, washed with isopropanol and dried. There is thus obtained 4-diphenyl-methylene-1-(4-tert.-butyl-benzyl)-piperidine which, after recrystallisation from isopropanol, has a melting point of 286°–287° C.

Calculated for $C_{29}H_{33}N.HCl$; 8.20% $Cl^-$; 3.24% N; found; 8.46%$^-$; 3.27% N The following compounds are prepared in an analogous manner. The melting point given is that of the hydrochloride except for compounds 33, 34, 35, 39, 47 and 49 which were isolated as free base. Compound 26 was isolated both as free base and as hydrochloride. The solvent used for recrystallisation is indicated between brackets after the melting point.

1. 4-(4-chlorodiphenyl-methylene)-1-(4-tert.-butyl-benzyl)-piperidine; m.p. 283.5°–285.5° C. (isopropanol).

$C_{29}H_{32}ClN.HCl$ calc.: 3.0% N; 7.59% $Cl^-$; 15.20% total Cl; found: 3.04% N; 7.57% $Cl^-$; 15.15% total Cl.

2. 4-(3-chlorodiphenyl-methylene)-1-(4-tert.-butyl-benzyl)-piperidine; m.p. 273°–275° C. (isopropanol).

$C_{29}H_{32}ClN.HCl$ calc.: 3.00% N; 7.59% $Cl^-$; 15.20% total Cl found: 3.07% N; 7.54% $Cl^-$; 15.06% total Cl.

3. 4-(2-chlorodiphenyl-methylene)-1-(4-tert.-butyl-benzyl)-piperidine; m.p. 281°–282° C. (isopropanol).

$C_{29}H_{32}ClN.HCl$ calc.: 3.00% N; 7.59% $Cl^-$; 15.20% total Cl; found: 2.99% N; 7.58% $Cl^-$; 15.02% total Cl.

4. 4-(4-fluorodiphenyl-methylene)-1-(4-tert.-butyl-benzyl)-piperidine; m.p. 276°–278° C. (isopropanol).

$C_{29}H_{32}FN.HCl$ calc.: 3.11% N; 7.85% $Cl^-$ 4.22% F; found: 3.04% N; 7.93% $Cl^-$; 3.98% F.

5. 4-(4-trifluoromethyl-diphenyl-methylene)-1-(4-tert.-butyl-benzyl)-piperidine; m.p. 264°–265° C. (isopropanol).

$C_{30}H_{32}F_3N.HCl$ calc.: 2.80% N; 7.09% $Cl^-$; 11.39% F; found: 2.90% N; 7.04% $Cl^-$; 11.24% F.

6. 4-(3-trifluoromethyl-diphenyl-methylene)-1-(4-tert.-butyl-benzyl)-piperidine; m.p. 252°–253° C. (isopropanol).

$C_{30}H_{32}F_3N.HCl$ calc.: 2.80% N; 7.09% $Cl^-$; 11.39% F; found: 2.80% N; 7.25% $Cl^-$; 11.32% F.

7. 4-(4-chloro-4'-fluorodiphenyl-methylene)-1-(4-tert.-butyl-benzyl)-piperidine; m.p. 278°–279° C. (isopropanol).

$C_{29}H_{31}ClFN.HCl$ calc.: 2.89% N; 7.31% $Cl^-$; 14.62% total Cl; found: 2.83% N; 7.12% $Cl^-$; 14.23% total Cl.

calc.: 3.92% F; found: 4.20% F.

8. 4-(3,4-dimethyl-diphenyl-methylene)-1-(4-tert.-butyl-benzyl)-piperidine; m.p. 270°–271° C. (isopropanol).

$C_{31}H_{37}N.HCl$ calc.: 3.04% N; 7.70% $Cl^-$; found: 3.04% N; 7.62% $Cl^-$;

9. 4-diphenyl-methylene-1-o-xylyl-piperidine; m.p. 257°–258° C. (isopropanol).

$C_{26}H_{27}N.HCl$ calc.: 3.59% N; 9.09% $Cl^-$; found: 3.42% N; 8.87% $Cl^-$.

10. 4-diphenyl-methylene-1-m-xylyl-piperidine; m.p. 256°–257° C. (isopropanol).

$C_{26}H_{27}N.HCl$ calc.: 3.59% N; 9.09% $Cl^-$; found: 3.62% N; 9.15% $Cl^-$;

11. 4-(4-chlorodiphenyl-methylene)-1-p-xylyl-piperidine; m.p. 257°–258° C. (methanol).

$C_{26}H_{26}ClN.HCl$ calc.: 3.30% N; 8.35% $Cl^-$; 16.70% total Cl; found: 3.18% N; 8.21% $Cl^-$; 16.35% total Cl.

12. 4-(4-chlorodiphenyl-methylene)-1-m-xylyl-piperidine; m.p. 233°–234° C. (isopropanol).

$C_{26}H_{26}ClN.HCl$ calc.: 3.30% N; 8.35% $Cl^-$; 16.70% total Cl; found: 3.25% N; 8.28% $Cl^-$; 16.42% total Cl.

13. 4-diphenyl-methylene-1-(4-methoxy-benzyl)-piperidine; m.p. 271°–272° C. (ethanol).

$C_{26}H_{27}NO.HCl$ calc.: 3.45% N; 8.73% $Cl^-$; found: 3.46% N; 8.95% $Cl^-$.

14. 4-diphenyl-methylene-1-(3-methoxy-benzyl)-piperidine; m.p. 216°–217° C. (isopropanol).

$C_{26}H_{27}NO.HCl$ calc.: 3.45% N; 8.73% $Cl^-$; found: 3.49% N; 8.87% $Cl^-$.

15. 4-(2-chlorodiphenyl-methylene)-1-(4-methoxy-benzyl)-piperidine; m.p. 272°–273° C. (ethanol).

$C_{26}H_{26}ClNO.HCl$ calc.: 3.18% N; 8.05% $Cl^-$; 16.10% total Cl; found: 3.18% N; 8.14% $Cl^-$; 16.3% total Cl.

16. 4-(3-chlorodiphenyl-methylene)-1-(4-methoxy-benzyl)-piperidine; m.p. 253°–254° C. (methanol).

$C_{26}H_{26}ClNO.HCl$ calc.: 3.18% N; 8.05% $Cl^-$; 16.10% total Cl; found: 3.24% N; 8.10% $Cl^-$; 16.32% total Cl.

17. 4-(4-chlorodiphenyl-methylene)-1-(4-methoxy-benzyl)-piperidine; m.p. 256°–257° C. (isopropanol).

$C_{26}H_{26}ClNO.HCl$ calc.: 3.18% N; 8.05% $Cl^-$; 16.10% total Cl; found: 3.08% N; 7.97% $Cl^-$; 15.81% total Cl.

18. 4-(4-chlorodiphenyl-methylene)-1-(3-methoxy-benzyl)-piperidine; m.p. 236°–237° C. (methanol).

$C_{26}H_{26}ClNO.HCl$ calc.: 3.18% N; 8.05% $Cl^-$; 16.10% total Cl. found: 3.26% N; 7.84% $Cl^-$; 15.63% total Cl.

19. 4-(4-trifluoromethyl-diphenyl-methylene)-1-(4-methoxy-benzyl)-piperidine; m.p. 257°–258° C. (isopropanol).

$C_{27}H_{26}F_3NO.CHl$ calc.: 2.97% N; 7.47% $Cl^-$; 12.02% F; found: 2.94% N; 7.46% $Cl^-$; 11.75% F.

20. 4-diphenyl-methylene-1-(4-chlorobenzyl)-piperidine; m.p. 264°–265° C. (isopropanol).

$C_{25}H_{24}ClN.HCl$ calc.: 3.41% N; 8.63% $Cl^-$; 17.26% total Cl; found: 3.40% N; 8.74% $Cl^-$; 17.2% total Cl.

21. 4-diphenyl-methylene-1-(4-nitrobenzyl)-piperidine; m.p. 256°–257° C. (isopropanol).

$C_{25}H_{24}N_2O_2.HCl$ calc.: 6.65% N; 8.42% $Cl^-$; found: 6.34% N; 8.63% $Cl^-$.

22. 4-diphenyl-methylene-1-(3-nitrobenzyl)-piperidine; m.p. 264°–265° C. (isopropanol).

$C_{25}H_{24}N_2O_2.HCl$ calc.: 6.65% N; 8.42% $Cl^-$; found: 6.36% N; 8.32% $Cl^-$.

23. 4-diphenyl-methylene-1-piperonyl-piperidine; m.p. 265°–266° C. (isopropanol).

$C_{26}H_{25}NO_2.HCl$ calc.: 3.33% N; 8.44% $Cl^-$; found: 3.38% N; 8.60% $Cl^-$.

24. 4-(4-chlorodiphenyl-methylene)-1 piperonyl-piperidine; m.p. 283°–284° C. (isopropanol).

$C_{26}H_{24}ClNO_2.HCl$ calc.: 3.08% N; 7.80% $Cl^-$; 15.60% total Cl; found: 2.95% N; 7.85% $Cl^-$; 15.95% total Cl.

25. 4-diphenyl-methylene-1-(2-naphthyl-methyl)-piperidine; m.p. 280°–281° C. (isopropanol).

$C_{29}H_{27}N.HCl$ calc.: 3.28% N; 8.32% $Cl^-$; found: 3.12% N; 8.10% $Cl^-$.

26. 4-(4-chlorodiphenyl-methylene)-1-benzyl-piperidine; m.p. of the base 89 –90 C. (petroleum ether b.p. 40 –60 C.).

C H ClN calc.: 3.75% N; 9.48% Cl; found: 3.61% N; 9.18% Cl.

m.p. of the hydrochloride 268 –269 C. (isopropanol).

C H ClN.HCl calc.: 3.41% N; 8.64% Cl ; 17.28% total Cl; found: 3.34% N; 8.47% Cl ; 16.82% total Cl.

27. 4-(4-tert.-butyl-diphenyl-methylene)-1-(4-tert.-butyl-benzyl)-piperidine; m.p. 308 –309 C. (decomposition) (isopropanol).

C H N.HCl calc.: 2.86% N; 7.26% Cl ; found: 2.80% N; 7.21% Cl .

28. 4-(4-tert.-butyl-diphenyl-methylene)-1-benzyl-piperidine; m.p. 274 –276 C. (isopropanol).

C H N.HCl calc.: 3.24% N; 8.24% Cl ; found: 3.10% N; 8.65% Cl .

29. 4-(4-methyl-diphenyl-methylene)-1-(4-tert.-butyl-benzyl)-piperidine; m.p. 281 –282 C. (isopropanol).

C H N.HCl calc.: 3.14% N; 7.94% Cl ; found: 3.12% N; 8.08% Cl .

30. 4-diphenyl-methylene-1-(4-isopropyl-benzyl)-piperidine; m.p. 269 –270 C. (isopropanol).

C H N.HCl calc.: 3.35% N; 8.48% Cl ; found: 3.31% N; 8.43% Cl .

31. 4-diphenyl-methylene-1-(4-n-butyl-benzyl)-piperidine; m.p. 240 –241 C. (isopropanol).

C H N.HCl calc.: 3.24% N; 8.24% Cl ; found: 3.22% N; 8.14% Cl .

32. 4-(4-chlorodiphenyl-methylene)-1-(4-isopropyl-benzyl)-piperidine; m.p. 249 –250 C. (isopropanol).

C H ClN.HCl calc.: 3.09% N; 7.83% Cl ; 15.67% total Cl; found: 3.11% N; 7.68% Cl ; 15.34% total Cl.

33. 4-(4-fluorodiphenyl-methylene)-1-(4-n-butyl-benzyl)-piperidine; m.p. of the base 76 –77 C. (petroleum ether b.p. 40 –60 C.).

C H FN calc.: 3.38% N; 4.59% F; found: 3.43% N; 4.59% F.

34. 4-diphenyl-methylene-1-(4-trifluoromethyl-benzyl)-piperidine; m.p. of the base 100 –101 C. (petroleum ether b.p. 40 –60 C.).

C H F N calc.: 3.43% N; 13.98% F; found: 3.22% N; 13.84% F.

35. 3-diphenyl-methylene-1-(4-isopropyl-bnenzyl)-piperidine; m.p. of the base 106 –107 C. (petroleum ether b.p. 40 –60 C.).

C H N calc.: 3.67% N; found: 3.51% N 36. 4-(4-chlorodiphenyl-methylene)-1-(4-n-butyl-benzyl)-piperidine; m.p. 212 –213 C. (isopropanol).

C H ClN.HCl calc.: 3.0% N; 7.60% Cl ; 2.88% N; 7.42% Cl .

37. 4-(-chlorodiphenyl-methylene)-1-(4-trifluoromethyl-benzyl)-piperidine; m.p. 246 –247 C. (isopropanol).

C H ClF N.HCl calc.: 2.92% N; 7.42% Cl ; 14.84% total Cl; found: 2.91% N; 7.44% Cl ; 15.04% total Cl.

38. 4-(4-fluoro-4 -trifluoromethyl-diphenyl-methylene)-1-(4-isopropyl-benzyl)-piperidine; m.p. 243 –244 C. (isopropanol).

C H F N.HCl calc.: 2.77% N; 7.03% Cl ; 15.07% F; found: 2.71% N; 6.92% Cl ; 14.85% F.

39. 4-(4-methoxy-diphenyl-methylene)-1-(4-tert.-butyl-benzyl)-piperidine; m.p. of the base 102 –103 C. (isopropanol).

C H NO calc.: 3.29% N; found: 3.26% N.

40. 4-(3-methyl-diphenyl-methylene)-1-benzyl-piperidine; m.p. 255 –256 C. (isopropanol).

C H N.HCl calc.: 3.59% N; 9.09% Cl ; found: 3.39% N; 9.08% Cl .

41. 4-(4-fluorodiphenyl-methylene)-1-benzyl-piperidine; m.p. 251 –252 C. (isopropanol).

C H FN.HCl calc.: 3.56% N; 4.82% F; 9.0% Cl ; found: 3.54% N; 4.90% F; 8.81% Cl .

42. 4-(2-methoxy-diphenyl-methylene)-1-(4-tert.-butyl-benzyl)-piperidine; m.p. 251 –252 C. (isopropanol).

C H NO.HCl calc.: 3.03% N; 7.67% Cl ; found: 2.98% N; 7.62% Cl .

43. 4-(4-methoxy-diphenyl-methylene)-1-(4-n-butyl-benzyl)-piperidine; m.p. 202 –203 C. (isopropanol).

C H NO.HCl calc.: 3.03% N; 7.67% Cl ; found: 3.02% N; 7.68% Cl .

44. 4-diphenyl-methylene-1-(5-tetralyl-methyl)-piperidine; m.p. 269 –270 C. (ethanol).

C H N.HCl calc.: 3.25% N; 8.24% Cl ; found: 3.20% N; 8.23% Cl .

45. 4-diphenyl-methylene-1-(6-tetralyl-methyl)-piperidine; m.p. 265 –266 C. (ethanol).

C H N.HCl calc.: 3.25% N; 8.24% Cl ; found: 3.23% N; 8.09% Cl .

46. 4-(4-chlorodiphenyl-methylene)-1-(6-tetralyl-methyl)-piperidine; m.p. 268 –269 C. (isopropanol).

C H ClN.HCl calc.: 3.01% N; 7.71% Cl ; 15.42% total Cl; found: 3.03% N; 7.68% Cl ; 15.37% total Cl.

47. 3-diphenyl-methylene-1-(4-fluorobenzyl)-piperidine; m.p. of the base 103 –104 C. (isopropanol).

C H FN calc.: 3.91% N; 5.31% F; found: 3.83% N; 5.23% F.

48. 4-(4-chlorodiphenyl-methylene)-1-(4-cyano-benzyl)-piperidine; m.p. 246 –247 C. (isopropanol).

C H ClN .HCl calc.: 6.41% N; 8.14% Cl ; 16.28% total Cl; found: 6.41% N; 8.15% Cl ; 16.29% total Cl.

49. 4-(3-methyl-diphenyl-methylene)-1-(4tert.-butyl-benzyl)-piperidine; m.p. of the base 112 –113 C. (isopropanol).

C H N calc.: 3.41% N; found: 3.40% N.

50. 4-(4-fluoro-4 -trifluoromethyl-diphenyl-methylene)-1-benzyl-piperidine; m.p. 234 –235 C. (isopropanol).

C H F N.HCl calc.: 3.03% N; 7.67% Cl ; found: 2.89% N; 7.54% Cl .

51. 4-(4-trifluoromethyl-diphenyl-methylene)-1-(5-tetralyl-methyl)-piperidine; m.p. 235 –236 C. (methanol).

C H F N.HCl calc.: 2.81% N; 7.11% Cl ; 11.43% F; 2.80% N; 7.12% Cl ; 11.26% F.

Example 2

4-(4-chlorodiphenyl-methylene)-1-(4-tert.-butyl-benzyl)-piperidine.

This compound already described in Example 1 (compound 1) can also be prepared in the following manner:

A mixture of 18.11 g. alpha-(4-chlorophenyl)-alpha-phenyl-4 -piperidine-methanol, 14.7 g. p-tert.-butyl-benzyl bromide and 9.5 g. anhydrous soidum carbonate in 45 ml. xylene is heated to 120 C. for 8 hours. After filtration of the reaction mixture to remove precipitated sodium bromide formed, the filtrate is evaporated in a vacuum and the residue is dissolved in 1 litre ethanol. The solution is then saturated with gaseous hydrogen chloride, while cooling. After leaving the reaction mixture to stand overnight, it is boiled under reflux for 1–2 hours. Excess solvent is then evaporated off and the residue is recrystallised from isopropanol. There is thus obtained the hydrochloride of 4-(4-chlorodiphenyl-methylene)-1-(4-tert.-butyl-benzyl)-piperidine, which has a melting point of 283.5°–285.5° C. Calculated for $C_{29}H_{32}ClN.HCl$ 3.00% N 7.59% $Cl^-$ 1- 5.20% total Cl found: 3.03% 7.60% 15.2%

The following compounds are prepared in an analogous manner:

1. 2-diphenyl-methylene-1-(4-tert.-butyl-benzyl)-piperidine; after recrystallisation from benzene, the base has a melting point of 191°–193° C.
   $C_{29}H_{33}N$ calc.: 3.54% N; found: 3.50% N.
2. 3-diphenyl-methylene-1-(4-tert.-butyl-benzyl)-piperidine; m.p. of the base 135°–136° C.
   $C_{29}H_{33}N$ calc.: 3.54% N; found: 3.58% N.
3. 2-(4-fluorodiphenyl-methylene)-1-(4-tert.-butyl-benzyl)-piperidine; after recrystallisation from petroleum ether (b.p. 40°–60° C.), it has a melting point of 198°–200° C.
   $C_{29}H_{32}FN$ calc.: 3.38% N; 4.59% F; found: 3.28% N; 4.42% F.
4. 2-diphenyl-methylene-1-(4-trifluoromethyl-benzyl)-piperidine; dehydration agent used: 50 percent sulfuric acid; m.p. of the base 116°–117° C. (isopropanol).
   $C_{26}H_{24}F_3N$ calc.: 3.43% N; 13.90%F; found: 3.32% N; 13.70% F.
5. 3-diphenyl-methylene-1-(4-n-butyl-benzyl)-piperidine; dehydration agent used: 50 percent sulfuric acid; m.p. 191°–192° C. (isopropanol).
   $C_{29}H_{33}N.HCl$ calc.: 3.24% N; 8.20% $Cl^-$; found: 3.26% N; 8.03% $Cl^-$.

For the pharmacologic tests, the following compounds according to the invention were used:

A. 4-diphenyl-methylene-1-(4-tert.-butyl-benzyl)-piperidine.
B. 4-diphenyl-methylene-1-(4-methoxy-benzyl)-piperidine.
C. 4-diphenyl-methylene-1-piperonyl-piperidine.
D. 4-(4-fluorodiphenyl-methylene)-1-(4-tert.-butyl-benzyl)-piperidine.
E. 4-(2-chlorodiphenyl-methylene)-1-(4-tert.-butyl-benzyl)-piperidine.
F. 4-(3-chlorodiphenyl-methylene)-1-(4-tert.-butyl-benzyl)-piperidine.
G. 4-(2-chloro-diphenyl-methylene)-1-(4-methoxy-benzyl)-piperidine.
H. 4-(4-trifluoromethyl-diphenyl-methylene)-1-(4-methoxy-benzyl)-piperidine.
I. 4-(4-chlorodiphenyl-methylene)-1-(4-methoxy-benzyl)-piperidine.
J. 4-(4-tert.-butyl-diphenyl-methylene)-1-(4-tert.-butyl-benzyl)-piperidine.
K. 4-diphenyl-methylene-1-(4-n-butyl-benzyl)-piperidine.
L. 4-(4-chlorodiphenyl-methylene)-1-(4-isopropyl-benzyl)-piperidine.
M. 4-(4-fluorodiphenyl-methylene)-1-(4-n-butyl-benzyl)-piperidine.
N. 4-(4-fluoro-4'-trifluoromethyl-diphenyl-methylene)-1-(4-isopropyl-benzyl)-piperidine.
O. 4-(2-methoxy-diphenyl-methylene)-1-(4-tert.-butyl-benzyl)-piperidine.
P. 4-diphenyl-methylene-1-(4-isopropyl-benzyl)-piperidine.
Q. 4-(4-chlorodiphenyl-methylene)-1-(4-n-butyl-benzyl)-piperidine.
R. 4-(4-chlorodiphenyl-methylene)-1-(4-tert.-butyl-benzyl)-piperidine.
S. 4-(4-chloro-4'-fluoro-diphenyl-methylene)-1-(4-tert.-butyl-benzyl)-piperidine.
T. 4-(4-trifluoromethyl-diphenyl-methylene)-1-(4-tert.-butyl-benzyl)-piperidine.

I. Activity on blood circulation

The hemodynamic effects are studied in anesthetized dogs subjected to artificial respiration under the experimental conditions described by D. WELLENS and E. WAUTERS (Arch.int.Pharmacodyn.171,(1968),2-46–250).

The cardiac, musculo-cutaneous and cerebral outputs are measured by means of peri-arterial sounds placed respectively around the femoral (A), carotidian (B), coronary (C) arteries, the aorta (D) and the vertebral arteries (E).

The maximum score per animal "2" is assigned to a compound that brings about an increase of circulation of at least 20 percent for at least 20 minutes. The maximum scroe per experiment carried out on two dogs is 4, with the possibility of the intermediates from 0 to 4. For the purpose of comparison, the corresponding values for two known compounds, papaverine and theophylline, are also given.

| Compounds | Doses mg./kg. | (A) | (B) | (C) | (D) | (E) |
|---|---|---|---|---|---|---|
| X | 2 | 1.5 | 2 | 2 | 2 | 1.5 |
| Y | 20 | 0 | 1.5 | 1 | 2 | 4 |
| A | 2 | 1 | 2 | 4 | 0 | 2.5 |
| B | 2 | 3 | 3 | | 1 | 1.5 |
| C | 2 | 3 | 1 | 0 | 1 | 2 |
| D | 2 | 1 | 3 | 4 | 1 | 2 |
| E | 2 | 4 | 4 | | 4 | 4 |
| F | 2 | 1 | 2 | 0 | 1 | 1 |
|   | 5 | 4 | 3 | 1 | 3 | 4 |
| G | 2 | 2 | 4 | 4 | 1 | 4 |
| H | 1 | 1 | | 3 | 3.5 | 4 |
| I | 2 | 2 | 2 | 3 | 1.5 | 2.5 |
| J | 2 | 4 | 0 | | 0 | 0 |
| K | 2 | 3 | 2 | | 2 | 4 |
| L | 2 | 3 | 2 | | 1 | 4 |
| M | 2 | 4 | 2 | | 2 | 4 |
| N | 2 | 2 | 2 | | 3 | 2 |
| O | 2 | 3 | 3 | | 3 | 3 |

X = papaverine
Y = theophylline

II. Anti-arrhythmic effects

Dogs are anesthetized by means of intraperitoneal injection of pentobarbital. The electrocardiogram and the systemic arterial pressure are recorded. Ouabain is intravenously injected until persistent arrhythmia, manifested by ventricular tachycardia or more often by manifold ventricular extra-systoles. After definitive installation of the arrhythmia (control period of 30 minutes) the compounds to be tested are intraveneously injected. Return to auricular rhythm within 10 minutes is considered to be an indication of anti-arrhythmic activity.

Under these experimental conditions, the anti-arrhythmic effect of the compounds according to the invention was confirmed at the intravenous dose of 5 mg./kg.:

compound S: two positive experiments
compound F: two positive experiments dihydroquinidine (reference compound): 3 positive experiments.

Consequently, these compounds prove to have an anti-arrhythmic effect in dogs.

III. Antihistaminic activity

The antihistaminic activity of the compounds according to the invention has been studied in guinea-pigs using the method of D. BOVET and A.M. STAUB (C.R.Soc.Biol.124,(1937),547) as slightly modified by S. LEVIS & al. (Arch.Intern.Pharmacol.109,(1957),128). This test consists in determining the number of intravenously injected toxic doses of histamine that are neutralized by the previous administration of the antihistaminic agent. Amplitude and duration of the activity are evaluated.

The compounds to be tested are administered intravenously (2.5 mg./kg.) or orally (2.5 mg./kg. by means of a catheter).

The minimum intravenous dose of histamine that kills 100 percent of control guinea-pigs (300 to 400 g. body weight) varies between 0.4 and 0.5 mg./kg.

In the following Table, the toxic doses of histamine are given that are neutralized by the intravenous administration of the mentioned compounds, respectively after 1, 4, 24 and 48 hours:

| Compound | 1 hour | 4 hours | 24 hours | 48 hours |
|---|---|---|---|---|
| A | 1500 | 800 | 800 | 800 |
| D | 1000 | | 1400 | >1600 |
| E | 800 | | 1400 | |
| F | 1000 | | 1000 | |
| K | 1400 | | 1400 | |
| L | 1000 | | 1400 | |
| M | 1400 | | 1200 | |
| O | 1400 | | 800 | |
| P | 1400 | | 1400 | 800 |
| Q | 600 | | 1400 | |
| R | 1200 | 1800 | >2000 | >1800 |
| S | 100 | 1400 | 1000 | 1000 |
| T | >10 | 1400 | 1800 | 2000 |

The compounds according to the invention may be used as free bases or as salts of inorganic or organic pharmaceutically acceptable acids. They may be administered orally, rectally or parenterally in association with the usual pharmaceutical liquid or solid excipients in unit doses of 10 to 50 mg. according to the mode of administration.

I claim:

1. A compound of the formula

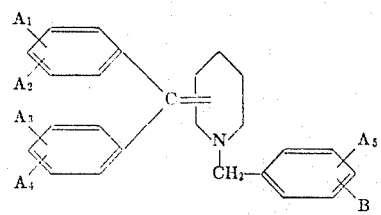

wherein $A_1$, $A_2$, $A_3$, $A_4$, $A_5$ and B, taken separately, each represents hydrogen, halogen, trifluoromethyl, alkyl of 1–4 carbon atoms, methoxy, nitro, cyano or amino, at least one of $A_5$ and B being other than hydrogen, or $A_5$ and B taken together represent a bivalent radical selected from the group consisting of alkylene, alkenylene and alkadienylene having 3 to 5 carbon atoms and alkylene dioxy having 1 to 3 carbon atoms, said bivalent radical being connected to two adjacent carbon atoms of the benzene ring and the pharmaceutically acceptable acid addition salts thereof.

2. A compound according to claim 1, said compound being 4-diphenyl-methylene-1-(4-tert.-butyl-benzyl)-piperidine.

3. A compound according to claim 1, said compound being 4-(4-fluoro-diphenyl-methylene)-1-(4-tert.-butyl-benzyl)-piperidine.

4. A compound according to claim 1, said compound being 4-(3-chlorodiphenyl-methylene)-1-(4-tert.-butyl-benzyl)-piperidine.

5. A compound according to claim 1, said compound being 4-diphenylmethylene-1-(4-n-butyl-benzyl)-piperidine.

6. A compound according to claim 1, said compound being 4-(4-chlorodiphenyl-methylene)-1-(4-isopropyl-benzyl)-piperidine.

7. A compound according to claim 1, said compound being 4-(4-fluorodiphenyl-methylene)-1-(4-n-butyl-benzyl)-piperidine.

8. A compound according to claim 1, said compound being 4-diphenylmethylene-1-(4-isopropyl-benzyl)-piperidine.

9. A compound according to claim 1, said compound being 4-(4-chlorodiphenyl-methylene)-1-(4-tert.-butyl-benzyl)-piperidine.

10. A compound according to claim 1, said compound being 4-(4-chloro-4'-fluoro-diphenyl-methylene)-1-(4-tert.-butyl-benzyl)-piperidine.

11. A compound according to claim 1, said compound being 4-(4-trifluoromethyl-dphenyl-methylene)-1-(4-tert.-butyl-benzyl)-piperidine.

* * * * *